Jan. 11, 1927.　　　　　　　　　　　　　　　　　　　　　　　　　　1,614,193
H. FELDMEIER
APPARATUS FOR AGITATING LIQUIDS
Filed Oct. 10, 1921　　　3 Sheets-Sheet 1

INVENTOR.
Harvey Feldmeier,
by Parker & Brockwow.
his ATTORNEYS.

Jan. 11, 1927.  H. FELDMEIER  1,614,193
APPARATUS FOR AGITATING LIQUIDS
Filed Oct. 10, 1921  3 Sheets-Sheet 2
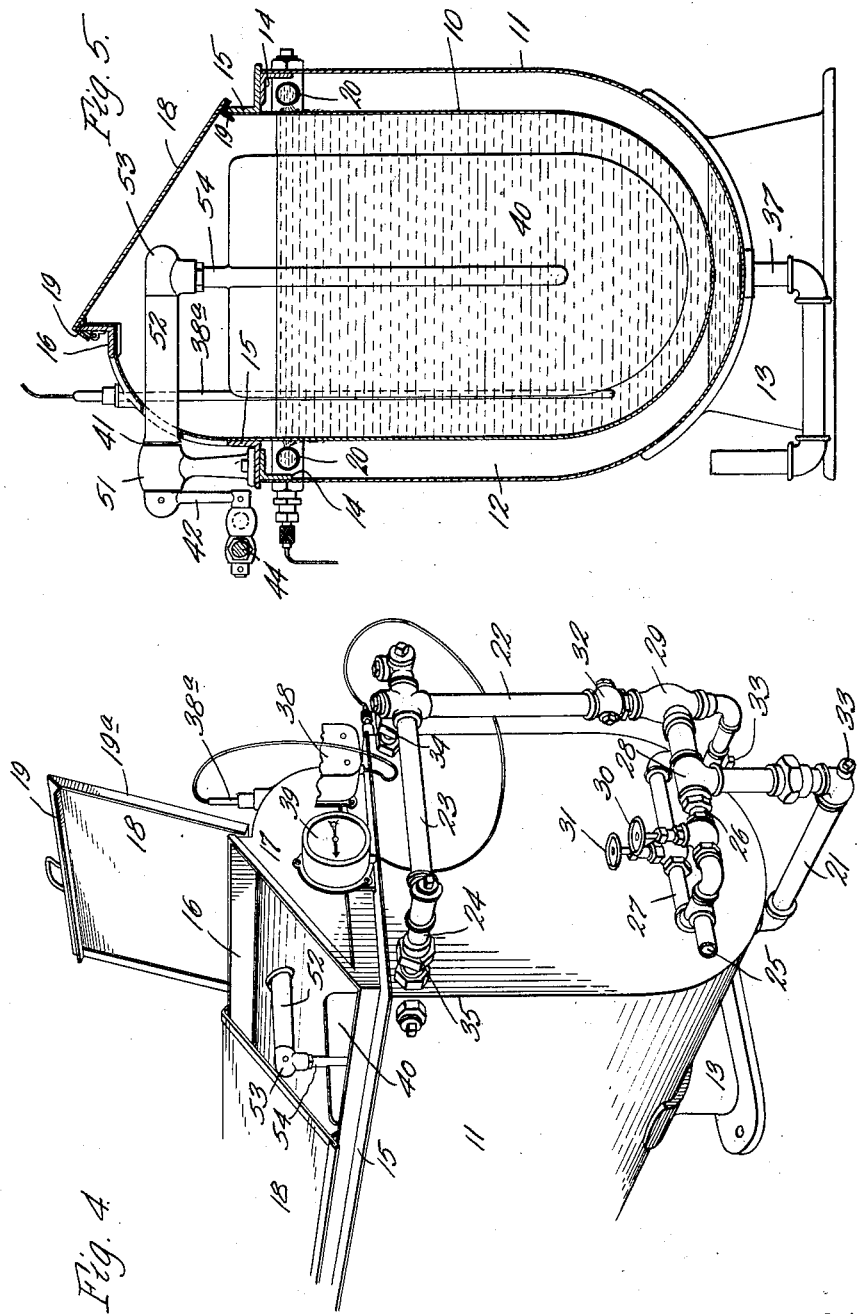
INVENTOR.
Harvey Feldmeier
by Parker Brockwow
his ATTORNEYS.

Jan. 11, 1927.
H. FELDMEIER
1,614,193
APPARATUS FOR AGITATING LIQUIDS
Filed Oct. 10, 1921    3 Sheets-Sheet 3
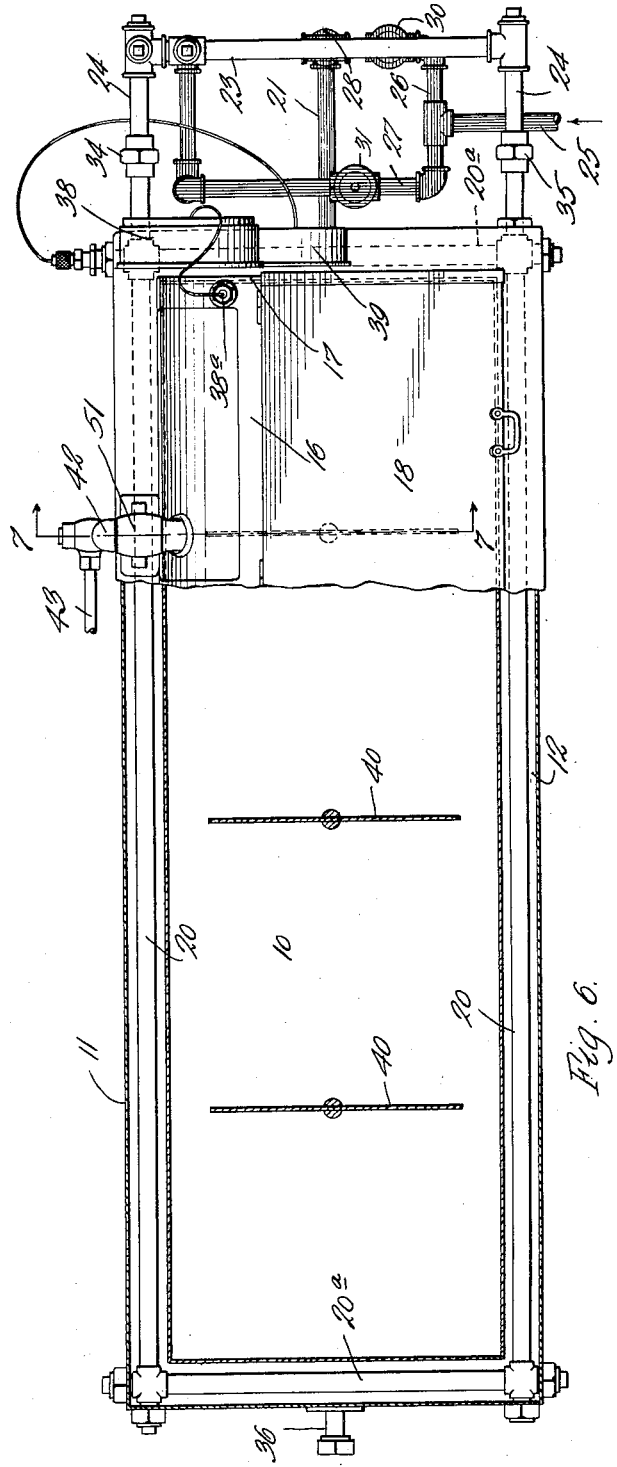
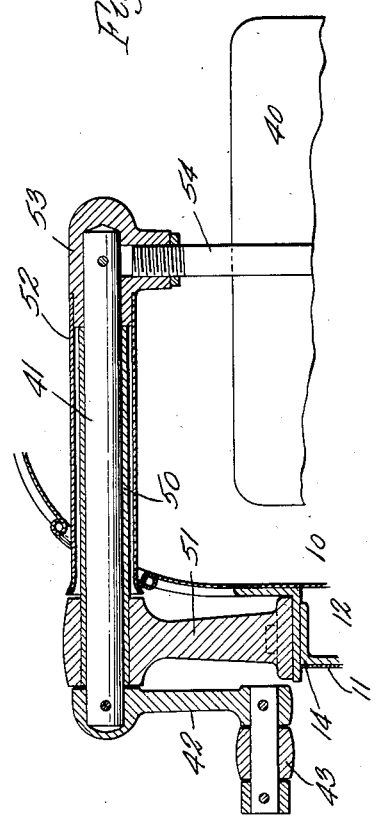
INVENTOR.
Harvey Feldmeier,
by Parker & Brochurs.
his ATTORNEYS Patented Jan. 11, 1927.

1,614,193

UNITED STATES PATENT OFFICE.

HARVEY FELDMEIER, OF LITTLE FALLS, NEW YORK, ASSIGNOR TO D. H. BURRELL & CO., INC., OF LITTLE FALLS, NEW YORK.

APPARATUS FOR AGITATING LIQUIDS.

Application filed October 10, 1921. Serial No. 506,647.

This invention relates to improvements in liquid Pasteurizers, heaters or coolers of the so called "batch" or "vat" type in which the liquid to be Pasteurized, heated or cooled is placed in bulk in a vat and is heated or cooled by causing a heating or cooling liquid to flow in a film over the outer surface of the walls of the vat. A well known machine of this type comprises a jacket forming an air space around the vat to insulate the vat and reduce radiation, spray pipes for discharging the temperature changing liquid against the outer surface of the vat so that it will flow in a film over such surface, a pump for circulating the temperature changing liquid, a heater for the same, and means for agitating the liquid in the vat so as to cause the different portions thereof to contact with the walls of the vat and thus increase the rapidity of exchange of heat between the liquid in the vat and the temperature changing or tempering medium.

One object of this invention is to provide a spray vat liquid Pasteurizer, heater or cooler of this type with simple, efficient and economical means whereby a large and uniform flow of the temperature changing medium is ensured, while the temperature of the same can be readily and accurately controlled, to give the results required. Other objects of the invention are to provide the vat with a hooded or covered top constructed so as to afford ready access to the vat for filling and cleaning the same, but minimize the opening, thereby reducing the size of the cover and reducing the exposure to the air when the cover is open, and making it easier to clean the vat without danger of slopping the cleaning liquid out of the vat; also to provide simple and effective operating mechanism for the liquid agitators, and to mount the agitators so as to afford strong and stable bearings for the same and prevent any splash or moisture from the vat from getting into the bearings, or any lubricant for the bearings from dropping into the vat; and also to improve machines of this sort in the other respects hereinafter described and set forth in the claims.

In the accompanying drawings:

Fig. 4 is a perspective view of the opposite end of the machine showing the circulating and temperature controlling means for the temperature changing liquid.

Fig. 5 is a transverse sectional elevation of the machine on an enlarged scale on line 5—5 of Fig. 2.

Fig. 6 is a plan view partially in horizontal section, on an enlarged scale, of the machine.

Fig. 7 is a transverse sectional elevation on an enlarged scale on line 7—7, Fig. 6, showing the bearing construction for one of the oscillating agitators.

Figure 1:
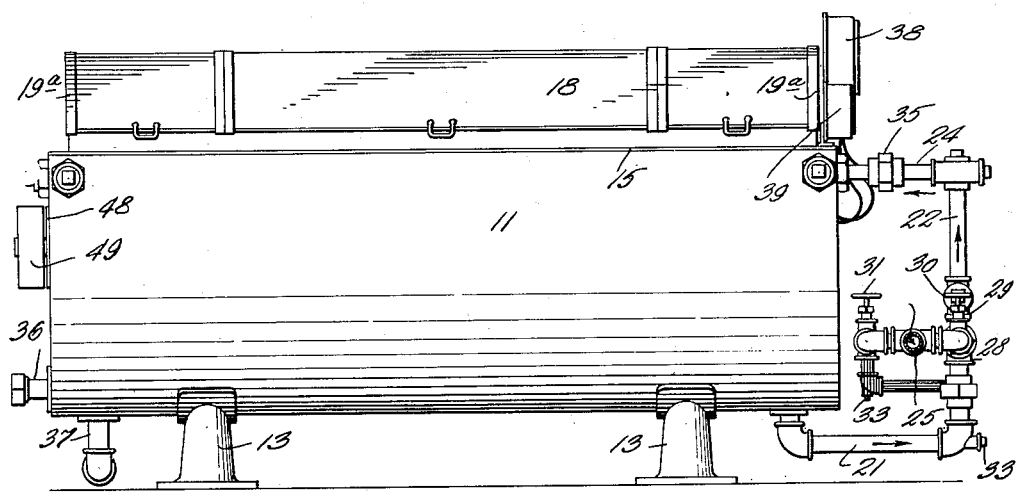
Fig. 1 is a front elevation of a vat Pasteurizer, heater or cooler embodying the invention.
Figure 2:
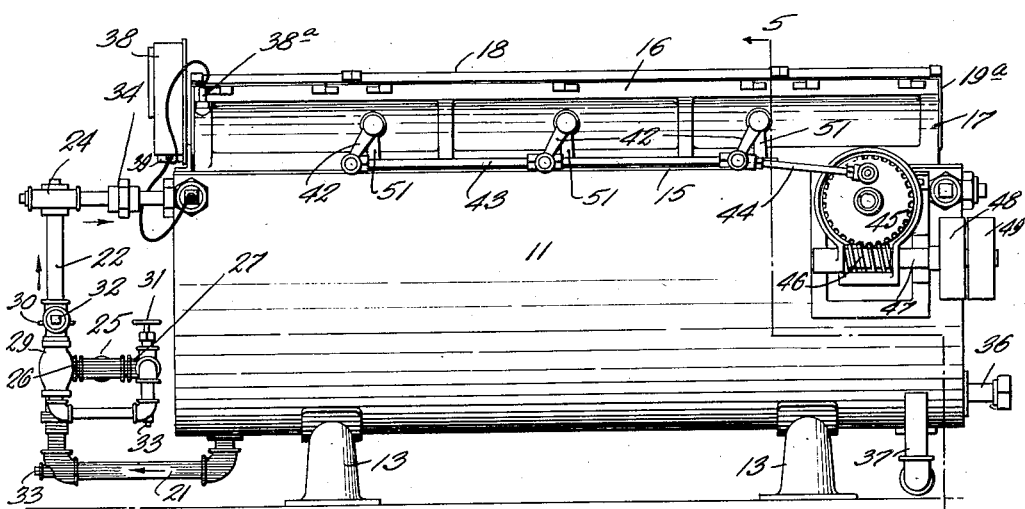
Fig. 2 is a rear elevation of the machine.
Figure 3:
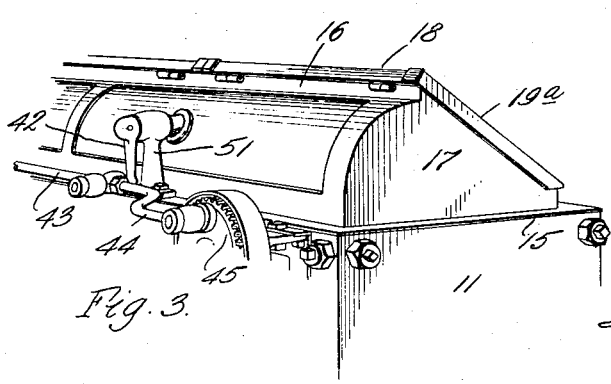
Fig. 3 is a fragmentary perspective view of one end of the machine showing the agitator operating mechanism.

The machine herein disclosed as an embodiment of the invention is primarily intended for heating milk or other liquid to and holding it for the required length of time at the proper temperature for Pasteurization, the subsequent cooling of the milk or liquid being performed in a separate cooler. While, for the sake of brevity and clearness of description, the machine is hereinafter described as a liquid heater, it will be understood that its construction is such that it is also adapted for cooling liquids if desired, by using a cooling medium instead of a heating medium.

10 represents the vat or vessel in which the milk or other liquid to be heated is placed and which is preferably of the shape shown, having approximately vertical side and end walls and a rounded or semi-cylindrical bottom. This vat, which is made of some good heat conducting material, such as sheet copper, is arranged within an outer jacket or casing 11 which forms a support for the vat and also an air space around the same to insulate the vat and reduce the radiation of heat therefrom. The jacket or casing is preferably of substantially similar shape to the vat but of sufficiently larger dimensions to form the air space 12 between the walls of the vat and of the jacket. 13 represents supporting legs or stands of any suitable construction for the jacket 11. Preferably the jacket 11 is provided at its upper end with a rim or strengthening frame formed of metal angle bars 14 having depending flanges to which the walls of the jacket are secured, and inwardly projecting horizontal flanges. The vat or inner vessel 10 is preferably provided at its upper portion with a surrounding strengthening frame formed of angle bars 15 having upwardly projecting flanges to which the walls of the vat are secured and outwardly projecting horizontal flanges which rest upon the angle bar rim of the jacket. The rear wall of the vat 10 preferably extends above the angle bar frame 15, curves inwardly over the vat and is secured at its longitudinal upper edge to a horizontal bar, preferably an angle bar, 16, which is secured at its ends to end castings or parts 17 forming upward extensions of the end walls of the vat. The closure of the upper end of the vat is completed by a cover or lid 18 which is preferably hinged to the horizontal bar 16 and extends downwardly therefrom at an inclination to the upper edge of the front wall of the vat. The cover 18 and upward extensions of the rear and end walls of the vat form a hood or closed upper portion for the vat. As shown, the cover or lid of the vat is formed in three separately hinged sections, thus enabling any one or more of the lid sections to be opened as desired to afford access to one or another portion of the vat. The lid sections are shown as provided at their upper and lower longitudinal edges with small angle bars 19 which form depending flanges cooperating with the adjacent edges of the vat, and the end sections of the cover have end flanges or angles 19ª cooperating with the end walls of the vat, thereby ensuring a proper closure of the vat.

The water or other liquid for heating the milk or liquid in the vat is sprayed or discharged against the outer surface of the walls of the vat, preferably by spray pipes arranged in the air space between the vat 10 and the jacket 11. 20 represents two of these spray pipes extending lengthwise of the vat in the upper portions of the space 12 between the front and rear walls of the vat and the jacket and provided with holes along their inner sides through which the heating liquid is discharged against the walls of the vat. Similar pipes 20ª are also preferably arranged crosswise at the ends of the machine between the end walls of the vat and the jacket and connected with the spray pipes 20 by cross couplings at the corners of the vat, or other suitable connections. The liquid flows down the walls of the vat and runs off of the rounded bottom of the vat into the bottom of the jacket from which it is preferably returned by suitable pipe connections to the spray pipes, the liquid being recirculated or used over and over again. Preferably the liquid is caused to circulate and is heated and its temperature regulated by a steam driving jet or ejector which is of a construction adapted to cause an active circulation of the liquid, and a supplemental or tempering steam jet or connection under the control of a regulating valve, whereby the temperature of the circulating liquid can be accurately regulated. The connections shown for this purpose are arranged as follows:

21 represents a return or suction pipe which extends from the bottom of the jacket or casing 11, and 22 indicates a main supply pipe which is connected by a cross pipe 23 and suitable connections 24 to the adjacent ends of the two longitudinal spray pipes 20. 25 represents a steam supply pipe which is provided with two branches 26 and 27. Connected in the liquid circulating system between the return pipe 21 and supply pipe 22 is a steam ejector or driving jet device 28, and a supplemental or tempering steam jet or suction T 29. The branch steam pipe 26 connects with the ejector or jet 28 which acts to draw the liquid from the bottom of the jacket or casing 11, drive the same through the supply pipe 22 and discharge the liquid from the spray pipes 20 and 20ª. The other branch steam pipe 27 connects with the tempering steam jet or suction T 29. The two branch steam pipes 26 and 27 are equipped with regulating valves 30 and 31 respectively so that the two steam jet devices 28 and 29 can be separately controlled by appropriate adjustments of their respective valves 30 and 31. The steam driving jet or ejector 28 can be an ordinary steam ejector of well known construction having a Venturi nozzle adapted to produce circulation of the heating liquid through the pipes 21, 22 and the spray pipes, and the tempering jet 29 can be an ordinary suction T. The driving jet or ejector 28 is properly proportioned to produce active circulation of a large volume of the liquid and to heat the circulating liquid partially but not completely to the required temperature, the additional heat necessary to bring the liquid up to the required temperature being supplied by the temperature regulating jet 29. In this way an active and substantially uniform circulation and heating of the liquid nearly to the required temperature is produced by the driving jet or ejector 28 and the supplemental jet 29 only has to supply the additional heat required to bring the liquid up to temperature. This additional heating can be readily and very accurately regulated as required without noticeable change in the flow of the liquid, by adjustment of the controlling valve 31. The temperature of the heating liquid can be gradually increased or altered as required to heat the milk or liquid in the vat to a predetermined temperature and to maintain it at this temperature as long as necessary, and a substantially constant ample circulation of the liquid is ensured by the primary or driving jet or ejector 28.

The liquid supply pipe 22 is preferably provided with a shut-off cock 32 and suitable drain plugs or valves 33 are shown in the lower portions of the return pipe 21 and branch steam pipe 27 for draining out the pipe connections when necessary. Suitable unions or nipples 34 and 35 are also preferably provided in the pipe connections between the main supply pipe 22 and the spray pipes so as to permit the convenient connection of supply pipes for cold water or a cooling medium in case it should be desired to cool the liquid in the vat, although in the ordinary operation of the machine it is preferred to run the liquid out of the vat through a discharge pipe or connection 36, and cool it in a separate cooler.

37 indicates an overflow pipe connected with the bottom of the jacket or casing 11 and having an upturned outer end whereby the level to which heating liquid can collect in the bottom of the jacket or casing, as indicated in Fig. 5, is determined.

38 represents a recording thermometer having its thermoresponsive element 38ª entering the vat 10 to show and record the temperatures of the liquid being heated, and 39 represents a thermometer having its thermoresponsive element entering one of the spray pipes 20ª to indicate the temperature of the spray liquid. The required conditions, as shown by these thermometers, can be readily obtained by regulating the steam jets 28 and 29 by appropriate adjustments of the valves 30 and 31. For example, it takes about twenty to twenty-five minutes to heat a vat of milk from say 50° F. to 145° F. The operator watches the thermometer 39 which indicates the temperature of the circulating water, and keeps that at about 160° F. to 170° F., and when the milk gets up to 145° F., as shown by the thermometer 38, he shuts off the steam from both jets 28 and 29. The air space 12 between the vat and the jacket prevents any material falling off in temperature during the holding period. If preferred, however, the steam jets can be regulated to give a reduced flow of the circulating water at a temperature which will prevent any drop in temperature of the milk during the holding period.

40 represents the agitators or paddles for agitating the liquid in the vat to cause all portions thereof to come into contact with the walls of the vat so as to ensure more uniform and rapid heating of the liquid. Any suitable number of these agitators or paddles can be employed, three being shown in the machine illustrated. Each paddle is secured at its upper end to a rock shaft 41 which is journaled in a bearing supported on the machine frame, and the several rock shafts are connected by rock arms 42 at their outer ends to a connecting rod 43 which extends lengthwise at one side of the machine and is adapted to be reciprocated by suitable drive mechanism for gently oscillating the several paddles in unison. As shown, the rock arm 42 for the paddle at one end of the machine is connected by a pitman 44 to a worm wheel 45 which is driven by a worm 46 on a drive shaft 47 mounted in suitable bearings on the machine and provided with fast and loose drive pulleys 48 and 49 or other suitable means for driving the shaft to oscillate the agitators. In order to prevent the liquid in the vat from being splashed onto the rock shafts and working into the shaft bearings, and also for preventing any lubricant for the bearings from dropping into the vat, each rock shaft 41 is preferably journaled in a long tubular bearing or bushing 50 which is rigidly secured in any suitable manner at its outer end in a bracket or post 51 fixed on the frame 15 at the rear side of the vat, the bearing 50 extending horizontally from this supporting bracket through a hole in the rear wall of the hood of the vat into the hood. Loosely surrounding the bearing 50 is a guard tube or sleeve 52. This sleeve is secured at its inner end to and is tightly closed by the hub or part 53 by which the shank 54 of the paddle is secured to the inner end of the rock shaft, and the sleeve extends outwardly around the bearing sleeve with its open outer end located outside of the hood of the vat. On account of this construction any liquid or moisture which may get on the guard sleeve will run off of the same without getting onto the rock shaft 41 or into its bearing, and any lubricant which may work out of the inner end of the shaft bearing 50 will run into the guard sleeve and will escape from the outer end thereof outside of the vat.

Since the operating mechanism for the paddles is arranged at the rear side of the machine with the paddle shafts extending through the fixed rear portion of the hood, the lids 18 at the front side of the machine can be opened and access afforded to the vat without disturbing in any wise the agitating mechanism. The vat can be thoroughly cleaned very easily and quickly as a hose can be used very freely since the hood prevents the cleaning water from slopping over the rear side of the vat, and the guard sleeves 52 keep the cleaning water or fluid out of the paddle shaft bearings.

I claim as my invention:

1. In an apparatus for changing the temperature of liquids, the combination of a stationary vat for the liquid, movable liquid agitating devices within the vat, a stationary hood attached to and extending from one side of the vat inwardly and above the vat and the agitating devices, but terminating for at least the major portion of its length in spaced relation to the opposite side of the vat, and a cover which extends from the inner portion of said hood and closes the vat at its opposite side and is movable to afford access to the vat and agitating devices.

2. In an apparatus for changing the temperature of liquids, the combination of a vat for the liquid, a stationary hood extending above the vat, and agitating devices extending from one side thereof into said vat, and a cover which extends from said hood and closes the vat at its opposite side and is movable to afford access to the vat and agitating devices.

3. In an apparatus for changing the temperature of liquids, the combination of a vat for the liquid, a stationary hood which extends upwardly and laterally over the vat from one side of the vat, and agitating devices extending from one side thereof into the vat, and a cover which inclines downwardly from said hood to the opposite side of the vat and is movable to afford access to the vat and agitating devices.

4. In an apparatus for changing the temperature of liquids, the combination of a vat for the liquid, a stationary hood which extends upwardly and laterally over the vat from one side of the vat, and agitating devices extending from one side thereof into the vat, and a movable cover which is hinged to said hood and inclines downwardly therefrom to the opposite side of the vat and is movable to afford access to the vat and agitating devices.

5. In an apparatus for changing the temperature of liquids, the combination of a vat for the liquid, a hood over the vat comprising a stationary part at one side of the vat and a part which is movable to open the vat at its opposite side, rock shafts extending inwardly at the upper portion of the vat from that side thereof where the stationary part of said hood is located, paddles depending into the vat from said rock shafts, and driving mechanism connected to the several rock shafts outside of the vat for oscillating said paddles.

6. In an apparatus for changing the temperature of liquids, the combination of a vat for the liquid, a stationary hood over the vat, rock shafts supported at one end outside of the vat and extending inwardly over the vat through said hood, paddles depending into the vat from said rock shafts, and driving mechanism connected to the outer ends of the several rock shafts for oscillating said paddles.

7. In an apparatus for changing the temperature of liquids, the combination of a vat for the liquid, a plurality of rock shafts supported at one end outside of the vat and extending inwardly over the vat from said side thereof, said vat having a door at the top opposite from said side, paddles depending into the vat from said rock shafts, connections between the outer ends of said rock shafts to cause them to rock in unison, and driving mechanism for oscillating said rock shafts and paddles.

8. In an apparatus of the character described, the combination of a vat for containing liquid, a tubular shaft bearing stationarily mounted at one side only of the vat and extending inwardly over the vat from said side, a rocking member extending through said bearing and projecting beyond the inner end thereof, a paddle secured to the projecting inner end of said member for agitating the liquid, means connected to the outer end of said member for rocking it, and means associated with said member for preventing liquid splash from the vat working into the bearings and any lubricant in the bearings from entering the vat.

9. In an apparatus of the character described, the combination of a vat for containing liquid, a tubular shaft bearing stationarily mounted outside of said vat at one side thereof and extending inwardly from said side, a rock shaft extending through said bearing and projecting beyond the inner end thereof, a paddle secured to the projecting inner end of said shaft for agitating the liquid, a guard sleeve surrounding said bearing, said sleeve being closed at its inner end beyond the inner end of said bearing and extending outside of the vat, and means for rocking said shaft.

10. In an apparatus of the character described, the combination of a vat for containing liquid, a tubular shaft bearing stationarily mounted outside of said vat at one side thereof and extending inwardly from said side, a rock shaft extending through said bearing and projecting beyond the inner end thereof, an agitating paddle having a hub secured to the projecting inner end of said shaft, a guard sleeve surrounding said bearing, said sleeve having its inner end secured to and closed by said hub and an open outer end extending outside of the vat, and means for rocking said shaft.

HARVEY FELDMEIER.